(12) United States Patent
Clyde

(10) Patent No.: US 6,250,463 B1
(45) Date of Patent: Jun. 26, 2001

(54) PORTABLE BARBECUE CARRYING APPARATUS

(75) Inventor: Drew Clyde, 18471 Happy La., Sonoma, CA (US) 95476

(73) Assignee: Drew Clyde, Sonoma, CA (US)

( * ) Notice: Subject to any disclaimer, the term of this patent is extended or adjusted under 35 U.S.C. 154(b) by 0 days.

(21) Appl. No.: 09/452,908

(22) Filed: Dec. 1, 1999

(51) Int. Cl.[7] ................................................. B65D 89/00
(52) U.S. Cl. ...................... 206/320; 229/520.03; 229/127
(58) Field of Search .................................. 206/320, 372, 206/349, 576; 229/120.03, 120.04, 120.05, 127, 128, 131.1

(56) References Cited

U.S. PATENT DOCUMENTS

| | | | |
|---|---|---|---|
| 2,112,433 | * 3/1938 | Boeye | 229/120.03 |
| 2,333,244 | * 11/1943 | Gordon | 229/120.05 |
| 2,570,508 | 10/1951 | Balkema . | |
| 2,622,785 | * 12/1952 | Kieckhefer | 229/120.05 |
| 2,719,665 | * 10/1955 | Tharpe et al. | 229/120.04 |
| 2,736,487 | * 2/1956 | George | 229/120.05 |
| 2,748,978 | * 6/1956 | Hennessey et al. | 229/120.05 |
| 2,835,432 | * 5/1958 | Wilmot | 229/127 |
| 2,867,206 | 1/1959 | Mendez . | |
| 3,148,822 | * 9/1964 | Yochum, Jr. | 229/120.05 |
| 3,294,308 | * 12/1966 | Tress et al. | 229/120.03 |
| 3,520,467 | * 7/1970 | Drnec et al. | 229/120.05 |
| 3,559,633 | 2/1971 | Born . | |
| 3,608,538 | 9/1971 | Guerrero . | |
| 3,812,839 | 5/1974 | Helgeson . | |
| 4,460,085 | 7/1984 | Jantzen . | |
| 4,550,828 | 11/1985 | Baldwin et al. . | |
| 5,065,937 | * 11/1991 | Ritter | 229/120.18 |
| 5,437,502 | 8/1995 | Warnick et al. . | |

* cited by examiner

*Primary Examiner*—Paul T. Sewell
*Assistant Examiner*—Shian Luong
(74) *Attorney, Agent, or Firm*—Townsend & Townsend & Crew LLP

(57) ABSTRACT

An apparatus for carrying and storing portable barbecue units. The apparatus includes a hollow body portion for holding the barbecue unit, or other device, and a lid having an opening through which the handle of the barbecue unit protrudes. The opening in the lid may be centrally located or may be offset from the center by an amount sufficient to compensate for the additional space required for attached gas valves, or the like, on one or more sides of the barbecue unit. An offset opening also allows one or more gas containers, barbecue utensils, or the like to be stored with the barbecue unit in the carrying apparatus. When the barbecue unit is placed in the carrying apparatus, the user secures the lid to the carrying apparatus whereby the handle extends through the opening. The user is then able to pick up the barbecue unit using the handle, thereby also picking up the carrying apparatus. Use of the carrying apparatus in this manner allows the user to carry the barbecue unit by the handle and to store the barbecue unit while at the same time preventing the barbecue unit from leaking or depositing grease and other undesirable byproducts of the barbecue process.

10 Claims, 1 Drawing Sheet

ISOMETRIC

SIDE

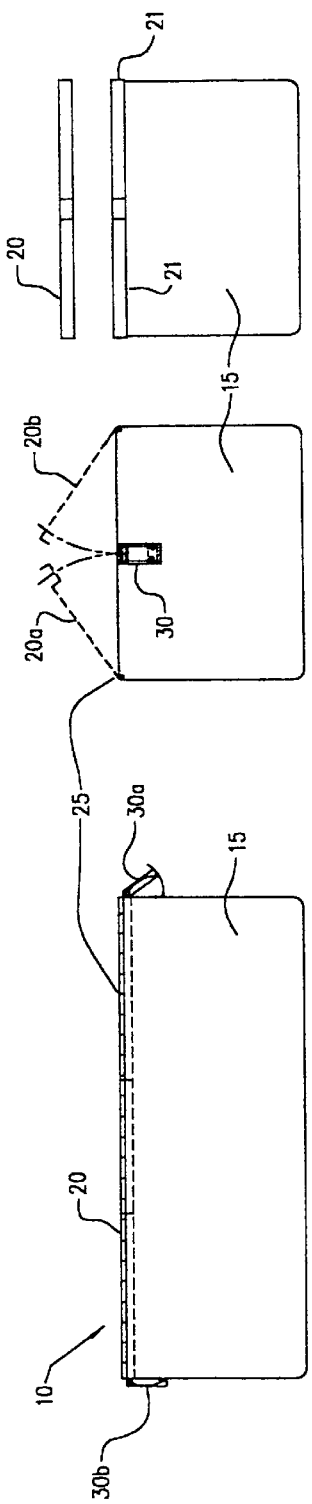
FIG. 1  SIDE
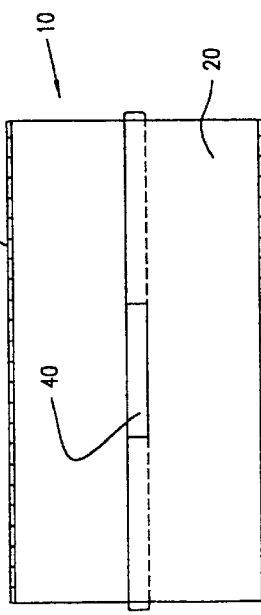
FIG. 3  TOP
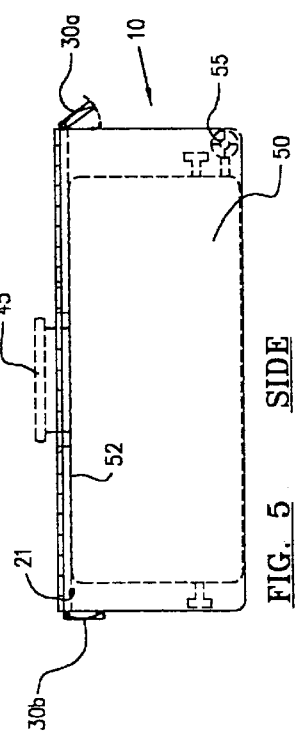
FIG. 5  SIDE
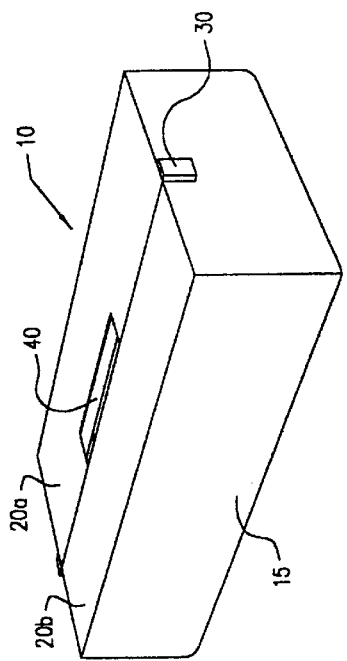
FIG. 2  END
FIG. 4  ISOMETRIC
FIG. 6  END

PORTABLE BARBECUE CARRYING APPARATUS

BACKGROUND OF THE INVENTION

The present invention relates generally to carrying apparatus for carrying devices having handles, and more particularly to carrying apparatus for carrying portable barbecue units having a handle.

Portable barbecue units are extremely popular today and are used in many different settings. Often used for barbecuing at home, perhaps the most popular use of portable barbecue units is for barbecuing on a camping trip or a picnic. In such cases, the user must store the barbecue unit for transportation, most often in an automobile. Generally such portable barbecue units include handles for ease of carrying the unit. The handle is typically located on the lid, which is secured to the body of the barbecue unit, thereby allowing a user to pick up the entire unit by the handle. One problem, however, is that often the barbecue unit leaks byproducts of the barbecue process, e.g., grease, such that the bottom and/or sides of the unit may be covered with such byproducts. In such case it is undesirable to place a dirty barbecue in an automobile or other storage location. One solution is to carry and store the unit in a cardboard box, such as the box the unit came in when purchased. This can be cumbersome, however, as the user typically must use two hands to carry the box. Additionally, grease or other byproducts leaking from the barbecue can contaminate the box, oftentimes eroding the box. The user must then obtain a different box or other container. It is therefore desirable to provide a durable carrying apparatus for carrying a portable barbecue unit that allows the user to carry the unit by the handle of the barbecue unit, and which allows the user to store the unit without concern for leaking byproducts of the barbecue process.

SUMMARY OF THE INVENTION

The present invention provides an apparatus for carrying devices having handles. In particular, the present invention is useful for carrying and storing portable barbecue units. The apparatus includes a hollow body portion for holding the barbecue unit, or other device, and a lid having an opening through which the handle of the barbecue unit protrudes. When the barbecue unit is placed in the carrying apparatus, the user secures the lid to the carrying apparatus whereby the handle extends through the opening. The user is then able to pick up the barbecue unit using the handle, thereby also picking up the carrying apparatus. Use of the carrying apparatus in this manner allows the user to carry the barbecue unit by the handle and to store the barbecue unit while at the same time preventing the barbecue unit from leaking or depositing grease and other undesirable byproducts of the barbecue process. The opening in the lid may be centrally located or may be offset from the center by an amount sufficient to compensate for the additional space required for attached gas valves, or the like, on one or more sides of the barbecue unit. An offset opening also allows one or more gas containers, barbecue utensils, or the like to be stored with the barbecue unit in the carrying apparatus.

According to an aspect of the invention, a carrying apparatus is provided for carrying an object having a handle coupled to a first surface of the object. The apparatus typically comprises a body structure having a first opening for receiving the object and a lid having a second opening defined therein for receiving the handle. The apparatus also typically includes a latch mechanism for securing the lid to the body structure. When the object is placed in the body structure and the lid is secured to the body structure, the handle protrudes through the second opening. Thereafter, when a user picks up the object using the handle, the first surface of the object comes into contact with the lid, causing the lid and body structure connected thereto to be picked up with the object.

According to another aspect of the invention, a carrying apparatus is provided for carrying a barbecue unit, wherein the barbecue unit includes a handle coupled to a top surface of the barbecue unit. The apparatus typically comprises a body structure having a first opening for receiving and holding the barbecue unit, and a lid for covering the first opening of the body structure, wherein the lid has a second opening defined therein for receiving the handle of the barbecue unit. When the barbecue unit is placed in the body structure and the lid is secured to the body structure, the handle protrudes through the second opening. Thereafter, when a user picks up the barbecue unit using the handle, the top surface of the barbecue unit comes into contact with the lid, causing the lid and body structure connected thereto to be picked up with the barbecue unit.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 1 illustrates a side view of a carrying device according to an embodiment of the present invention;

FIG. 2 illustrates an end view of the carrying device according to an embodiment of the present invention;

FIG. 3 illustrates a top view of the carrying device according to an embodiment of the present invention;

FIG. 4 illustrates an isometric view of the carrying device according to an embodiment of the present invention;

FIG. 5 illustrates a side view of the carrying device holding a barbecue unit according to an embodiment of the present invention; and FIG. 6 illustrates an end view of the carrying device according to an embodiment of the present invention.

DESCRIPTION OF THE SPECIFIC EMBODIMENTS

FIG. 1 illustrates a side view of a carrying device 10 according to an embodiment of the present invention. Carrying device 10 includes a body portion 15 and a lid 20. In one embodiment, lid 20 is coupled to body portion 15 by one or more hinges 25. For example, as shown in FIG. 2, lid 20 includes two portions 20a and 20b coupled to body portion 15 by hinges 25. Alternatively, lid 20 can be a single portion coupled to body portion 15 by one or more hinges 25. One or more latches 30 are provided to secure lid 20 to body portion 15.

In another alternate embodiment, lid 20 is a single piece construction that 30 fits over the top of body portion 15. In this embodiment, the lid is secured to body portion 15 by two or more latches 30, or other securing mechanism(s) as are well known. In yet another alternate embodiment, as shown in FIG. 6, for example, body portion 15 includes a lip 16 around which lid 20 mates so as to securely fasten around the perimeter of the top of body portion 15 without requiring a latching mechanism. In a further alternate embodiment, lid 20 is an integral part of body portion 15 formed, e.g., by a plastic molding process or other similar process. In this embodiment, no hinges are needed.

FIG. 3 illustrates a top view of carrying apparatus 10 according to an embodiment of the present invention. As shown, lid 20 includes an opening 40 defined therein for receiving the handle of an object placed within body portion 15 of carrying apparatus 10. In one embodiment, wherein lid 20 includes two portions 20a and 20b, opening 40 is defined in one portion, for example as shown in FIG. 4. Alternately, opening 40 can be partially defined in each of portions 20a and 20b.

In a preferred embodiment, carrying apparatus 10 is designed to carry a portable barbecue unit 50 having a handle 45 as shown in FIG. 5. It is understood, however, that carrying apparatus 10 is useful for carrying any of a number of devices or objects having handles. As shown in FIG. 5, when barbecue unit 50 is placed within body portion 15, and lid 20 is secured thereto, handle 45 protrudes through opening 40. Thereafter, when a user picks up barbecue unit 50 by handle 45, a top portion 52 of barbecue unit 50 comes in contact with a bottom portion 21 and lid 20 so that when the handle is raised to pick up the barbecue unit, carrying apparatus 10 is also picked up.

As shown in the Figures, body portion 15 preferably encloses the bottom and sides of an object placed therein. Securing lid 20 to the top of body portion 15 thereby completely encloses the object placed therein, other than opening 40 through which a handle protrudes. This embodiment is advantageous as it prevents any substances that may leak from the object placed therein, e.g., grease from a barbecue unit, to be captured by the bottom or sides of body portion 15. Additionally, this embodiment also allows for additional objects to be stored and carried within carrying apparatus 10 along with the object with the handle. For example, one may desire to carry and store barbecue implements, utensils, gas canister(s), matches, etc., along with barbecue unit 50.

Typically, the handle of a barbecue unit is centrally positioned on top of the barbecue unit relative to the main body of the barbecue unit. In some cases, however, it is typical for a barbecue unit to have attachments protruding out of the side of the main body. For example, as shown in FIG. 5, barbecue unit 50 includes a valve 55 for attaching to a gas canister. Thus, if opening 40 has an area substantially equal to the area of the top of handle 45 and is centrally located on lid 20, it may not be possible to close the lid once the barbecue unit is positioned within body portion 15. Therefore, according to one embodiment, opening 40 has substantially the same area as the top of handle 45 and is offset from the center of lid 20 by an amount sufficient to compensate for protruding parts such as valve 55. Additionally, this embodiment is advantageous as it allows for additional items to be stored within apparatus 10. For example, a user could store one or more gas canisters within apparatus 10 in the vicinity of valve 55.

In an alternate embodiment, opening 40 is centrally positioned on lid 20, but the area of opening 40 is greater than the area of handle 45 so as to compensate for an offset position of handle 45. For example, the dimensions of opening 40 may be longer and/or wider than the respective dimensions of handle 45. In yet another alternate embodiment, opening 40 is offset relative to the center of lid 20, and the dimensions of opening are longer and/or wider than the respective dimensions of handle 45.

Body portion 15 and lid 20 are preferably made of the same durable plastic or other rigid or semi-rigid material, but lid 20 and body portion 15 may be made of different materials. Additionally, any other material, such as a flexible, durable, cloth-like material may be used for either or both lid 20 and body portion 15. It is preferred that the material(s) used prevent leakage of grease or other liquid substances.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, although described as a single piece construction, body portion 15 may be constructed from two or more parts or materials. Additionally, one or more ledges or protrusions may be incorporated into the interior of body portion 15, such that when the device is picked up by a handle, a portion of the device comes into contact with the ledges or protrusions, in place of or in addition to the lid, thereby also picking up the carrying device. Therefore, the scope of the appended claims should be accorded the broadest interpretation so as to encompass all such modifications and similar arrangements.

What is claimed is:

1. A carrying apparatus in combination with a barbecue unit, wherein the barbecue unit includes a handle coupled to a top surface of the barbecue unit, the apparatus comprising:

a body structure having a first opening for receiving and holding the barbecue unit; and a lid for covering the first opening of the body structure, the lid having a second opening defined therein for receiving the handle of the barbecue unit;

wherein when the barbecue unit is placed in the body structure and the lid is secured to the body structure, the handle protrudes through the second opening, whereby when a user picks up the barbecue unit using the handle, the top surface of the barbecue unit comes into contact with the lid, causing the lid and body structure connected thereto to be picked up with the barbecue unit.

2. The apparatus of claim 1, wherein the second opening is centrally positioned on the lid.

3. The apparatus of claim 1, wherein the second opening is defined in an offset position relative to the center of the lid so as to compensate for an offset position of the handle of the barbecue unit relative to the center of the lid.

4. The apparatus of claim 1, wherein the lid is coupled to the body structure by one or more hinges.

5. The apparatus of claim 1, wherein the lid includes a first portion and a second portion.

6. The apparatus of claim 5, wherein the first and second lid portions are each coupled to the body structure by one or more hinges.

7. The apparatus of claim 1, wherein the body structure and lid are both made of a rigid material.

8. A carrying apparatus in combination with a barbecue unit, wherein the barbecue unit includes a handle coupled to a top surface of the barbecue unit, the apparatus comprising:

a body structure having a first opening for receiving and holding the barbecue unit; and a lid for covering the first opening of the body structure, the lid having a second opening defined therein for receiving the handle of the barbecue unit;

wherein when the barbecue unit is positioned in the body structure and the lid is secured to the body structure, the handle protrudes through the second opening, whereby when a user picks up the barbecue unit using the handle, the top surface of the barbecue unit contacts the lid so as to cause the lid and body structure secured thereto to be picked up with the barbecue unit.

9. The apparatus of claim 8, wherein the second opening has an area that is larger than the area of the top of the handle so as to compensate for an offset position of the handle of the barbecue unit relative to the center of the lid.

10. The apparatus of claim 8, wherein the second opening is centrally positioned on the lid.

* * * * *